Figure 1:
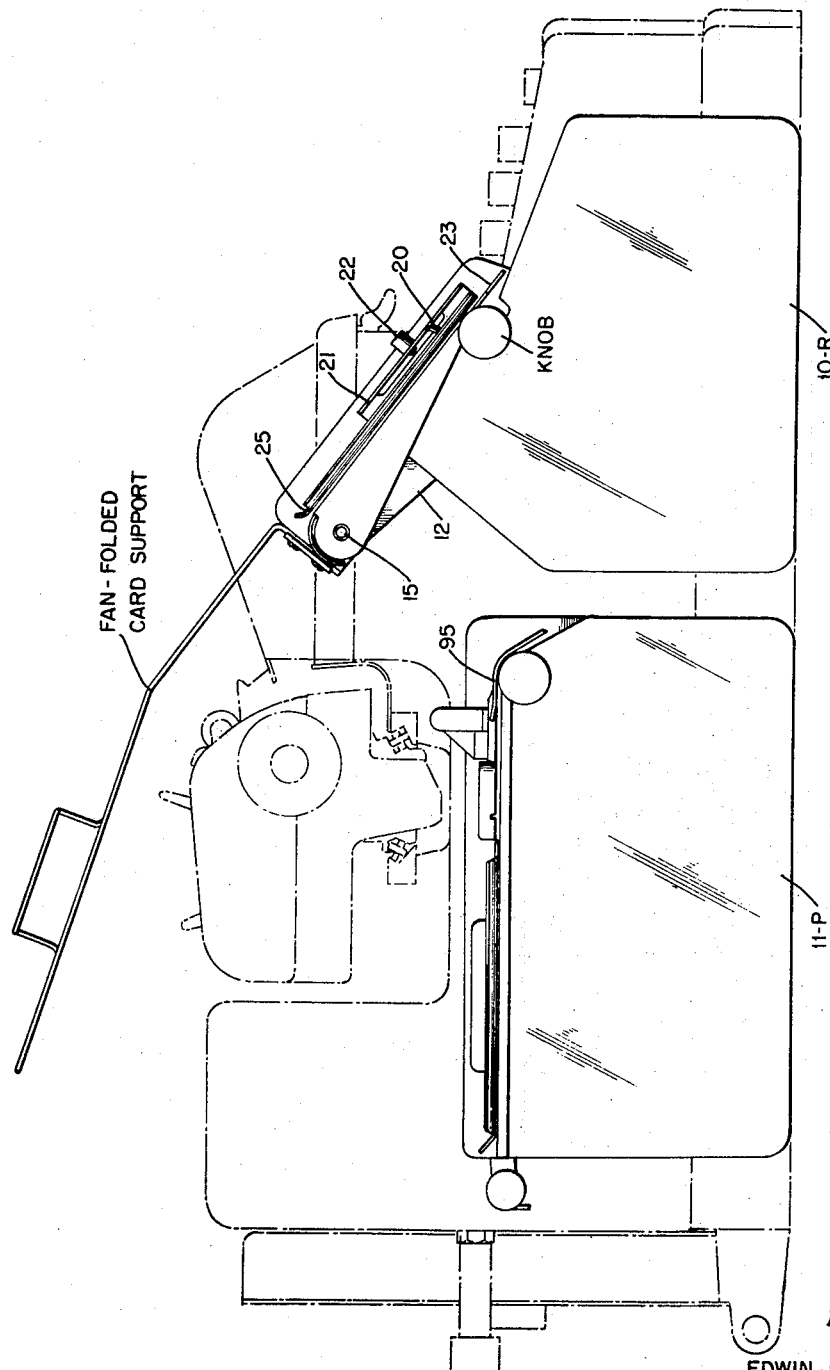

July 19, 1960   E. O. BLODGETT ET AL   2,945,623
TAPE AND CARD RECORD MEDIA READER
Original Filed Sept. 20, 1955   5 Sheets-Sheet 1

INVENTORS
EDWIN O. BLODGETT
BY  WILBUR C. AHRNS
ATTORNEY

INVENTORS
EDWIN O. BLODGETT
WILBUR C. AHRNS
BY
ATTORNEY

July 19, 1960    E. O. BLODGETT ET AL    2,945,623
TAPE AND CARD RECORD MEDIA READER
Original Filed Sept. 20, 1955    5 Sheets-Sheet 5

INVENTORS
EDWIN O. BLODGETT
BY    WILBUR C. AHRNS
John A. Harvey
ATTORNEY

United States Patent Office 2,945,623
Patented July 19, 1960

2,945,623

TAPE AND CARD RECORD MEDIA READER

Edwin O. Blodgett and Wilbur C. Ahrns, Rochester, N.Y., assignors to Commercial Controls Corporation, Rochester, N.Y., a corporation of Delaware Original application Sept. 20, 1955, Ser. No. 535,497, now Patent No. 2,905,298, dated Sept. 22, 1959. Divided and this application Nov. 17, 1958, Ser. No. 774,412

14 Claims. (Cl. 235—61.11)

The present invention relates to a punched-tape or card reader structure for deriving data and functional-control information punch recorded in a tape or card in the form of successive groups of aligned code apertures. One widely used application for such readers is for the automatic control of a writing machine in reproducing copy and the invention will be described in that connection.

The present application is a division of application Ser. No. 535,497, filed September 20, 1955, now United States Patent No. 2,905,298, granted September 22, 1959, to Edwin O. Blodgett and Wilbur C. Ahrns.

Tape controlled writing machines are in widespread use for preparing repetitive copy and, when extended to effect program control of the writing machine, to eliminate repetitive manual keyboarding operations and thereby reduce reproduction costs and chances of reproduction error. A tape controlled writing machine of this nature is the subject of United States Patent No. 2,700,446, granted January 25, 1955, to Edwin O. Blodgett. As there shown, manual operation of the writing machine key levers not only produces written copy but also causes actuation of a code selector by which each key lever may be identified by a preselected code. Functional control key levers are also identified by preselected codes whether such key lever is arranged to print or cause operation of a function only. The code employed is of the binary form in which the presence of a code bit is identified by the presence of an electrical potential and the absence of a code bit by the absence of such potential. These distinguishable binary codes produced in electrical form by operation of the writing machine are then used to control any device which can be operated by electrical code circuits, such as a tape punch used for the purpose of punching each character or functional code group in spaced relation into a tape. Such punched tape may then be used in a tape reading device to generate electrical code signals which are applied to a code translator. The latter responds to coded electric pulses for mechanically selecting and operating both character and functional key levers of the writing machine to reproduce written copy conforming to the information recorded on the punched tape.

Tape controlled writing machines of the type last described provide very high speed and extreme accuracy in reproducing documents and in eliminating repetitive manual keyboarding operations. When used for programming purposes, the writing machine under control of the program tape moves a document form to the correct reproducing position and prints in repetitive or invariable information established by programming information. When the program operation calls for the writing machine to stop to receive variable information, the operator manually prints such information into the document form and presses a switch which causes the program tape again to take over and control automatically all printing and functional operations until the programming calls for the next fill-in of variable information. This combined program control and operator manipulation continues to the completion of the form document. Since both the automatic and operator control of the writing machine is by key lever actuation, the code selector of the machine is operative again to code information printed on the document form as well as all functional operations, and the resultant electric code signals may again be used to punch a second or byproduct tape in one operation.

There are many applications where, in using a controlled writing machine of the type described, only a small amount of information relates to a given subject and the number of subjects are large and used in various selected sequences in writing any one document. It has been the practice to arrange unit record forms each comprising a short length of conventional punched tape relating to each such subject, and to select and use these unit records one after another in the required selected sequences. A short length of punched tape of this nature is difficult to file, and there is no convenient way of identifying each record. Additionally, a short length of tape is not easily inserted and removed from the machine. Accordingly, it would be desirable to provide such unit records by punching them from heavier material, such as card stock, and to use a card stock width sufficient to provide ample room for unit record identification. Standard tabulating cards are widely used in present day business practices and would be desirable to provide unit records by using one or both edge portions of the card for code punching, a card then being handled and filed in accordance with standard practices. Where only one edge of a tabulating card is punched to provide the unit record desired, a major portion of the card may then be retained for punching and use with tabulating codes employed in many forms of business machines. Another type of such unit record cards can be in conventional folded fan form, a form which readily facilitates the preparation of successive unit record one after the other in essentially continuous manner after which the cards are separated into unit lengths or into multiples of such unit lengths for convenient handling and use as unit records.

There are many instances where a master program tape or card may be prepared with relation to a particular form document, but being of "generic" form must include only the invariable information common to all of a number of related types of program operations encountered in using the form document. However in preparing the form document for specific purposes or individuals, such as a specific customer or policy holder, much information which is variable insofar as the form document is concerned becomes invariable from one specific use or individual to another. Thus it is frequently desirable to reproduce in automatic manner by use of a master or generic program tape or card one or more like or dissimilar master or species tapes or cards and even to use the latter in producing one or more species or subspecies program tapes or cards in the nature of unit records each containing a maximum amount of invariable information for a specific use or individual.

It is an object of the present invention to provide a novel reader unit for deriving information recorded in either a tape or edge-punched card record medium, and one which greatly facilitates the insertion with ease by an unskilled person of either tape or cards into correct reading position in the reader.

It is an object of the present invention to provide a novel reader unit for deriving information recorded in either punched-tape or punched-card record media and one which greatly facilitates insertion with ease and by an unskilled person of either tape or cards into correct reading position in the reader.

It is a further object of the invention to provide an improved tape-card reader which insures that a record card shall not be so incorrectly inserted into reading position in the reader that the latter fails to read any portion of the recorded information.

It is an additional object of the invention to provide a tape-card reader for reading record media having prepunched feed holes engaged by one or more feed drive sprockets of the reader and one which facilitates correct prepositioning of such feed holes with respect to the drive sprocket teeth at the time the record medium is inserted into the reader and prior to engagement of its feed holes with the drive sprocket teeth.

In accordance with the invention, a reader for reading information code-recorded on tape and card record media includes code reading means and feed means for moving tape and card media past the reading means to read the information recorded thereon. The reader includes a guide platform pivoted for manual movement to a first loading position at which either form of the record media is loaded into the reader out of engagement with the feed means and to a second read position at which the loaded medium is drivingly engaged by the feed means, and stop means cooperating with the platform in the loading position thereof for initially prepositioning the leading edge of card media with respect to the code reading means.

Other objects and advantages of the invention will appear as the detailed description thereof proceeds in the light of the drawings forming a part of this application in which:

Fig. 1 illustrates in elevational side view the outline of a writing machine embodying the present invention and shows the relative positioning of a tape-card reader embodying the present invention and forming a component thereof; and Figs. 2–7 illustrate the detailed construction of the tape-card reader unit of the invention.

An elevational outline illustration of a writing machine of the type shown in the aforementioned Blodgett patent, but including as a component thereof a tape-card reader unit 10–R embodying the present invention, is shown in Fig. 1 of the drawings. This writing machine may also include a punch unit 11P for producing punched tape and punched cards recording all data and functional control information required to reproduce all or selected portions of the printed copy.

The card-tape reader 10–R has a construction shown in detail in Figs. 3–7. It includes a base casting 11 and a subcasting 12 which together support the components of the reader unit. As shown more clearly in Figs. 2–4, the reader includes provision for reading either unit record punched cards or punched tape as desired. For this purpose, a plate 13 having an elongated card or tape engaging surface and flanged sides is supported at one end for limited angular movement by mechanical connection to a shaft 15 journaled in castings 11 and 12. The forward end of the plate 13 includes a depending arm 16 having a stud 17 engaged by one end of an over-center spring 18 which engages at its opposite end a stud 19 on the casting 12. The over-center spring 18 retains the plate 12 in the card or tape reading position shown in Fig. 2 or in an elevated card loading position, shown in Fig. 3, where the surface of the plate is engaged by a depending guide end 20 of an overhanging arm 21 affixed to the casting 11. The rear end of the plate 13 has a curvilinear end portion over which punched tape moves when using this form of record medium, and the forward end of this plate includes a projecting portion 23 which may be manually grasped readily to move the plate 13 between its upper and lower pivotal positions.

Figure 4:
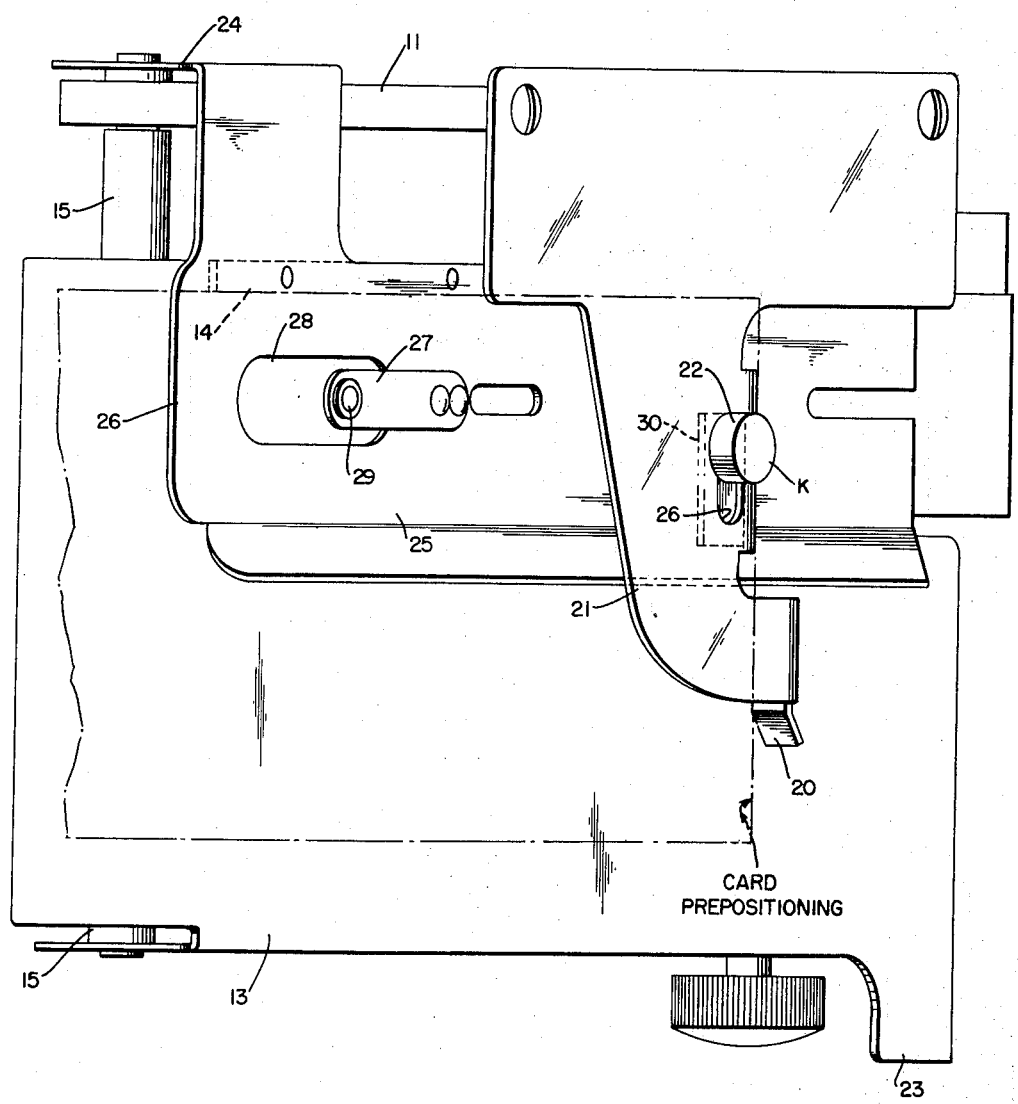
Figure 6:
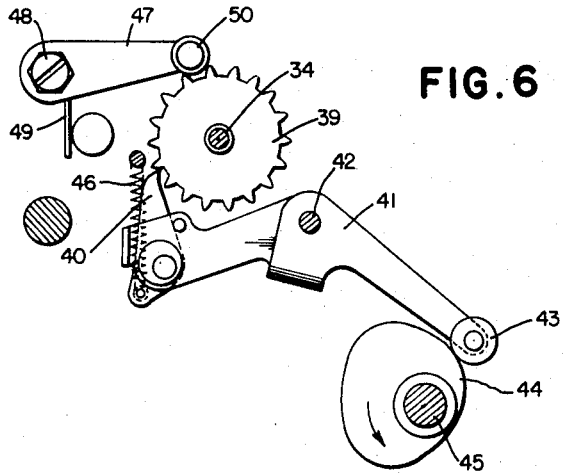
Figure 5:
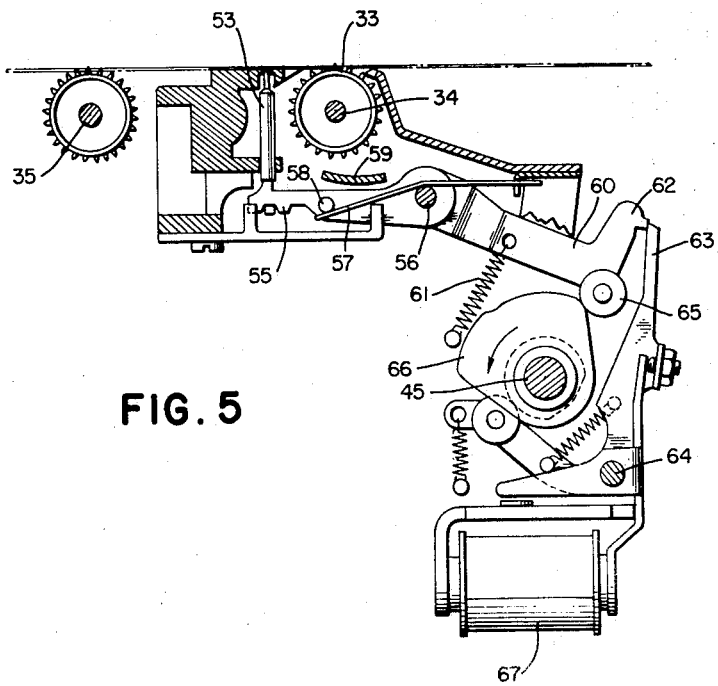

As shown more clearly in Fig. 4, the remote end of the shaft 15 has affixed thereto the depending arm 24 of an upper guide plate 25 having upturned rear and side portions. A tape or card locating spacer strip 14 is riveted between the plates 13 and 25, and the latter is fixedly supported by the shaft 15 to move in spaced relation to the plate 13 as the latter moves between its upper and lower pivotal positions. As thus arranged, the assembly comprised by the plates 13 and 25 is prepared to receive a punched card by moving the assembly to engage the plate 13 with the depending guide portion 20 of the fixed arm 21. A unit record punched card is now manually inserted between the plates 13 and 25, which are spaced to receive the card and retain it by frictional engagement. The card is aligned along its edge by engagement with the spacer or guide strip 14, and is positioned longitudinally by engagement of its end with the projection 20 of the stationary arm 21. After thus positioning the card, the assembly comprised by the plates 13 and 25 is then manually moved to the position shown in Fig. 2 where the card can move beneath the projection 21 and where longitudinally extended drive holes in the card are engaged by drive sprocket wheels of the reader unit. As shown in Fig. 4, a spring finger 27 fixed to the plate 25 extends through an aperture 28 of the latter and includes a ball point member 29 which engages the drive holes of the card to act as a form of light detent device to prevent displacement of the card during its movement from the projection 21 into driving engagement with both sprocket wheels of the reading unit.

For purposes of loading punched tape into the reading unit, a knob 22 has an integral stud portion extending through a slot 26 of the arm 21 and fixed to a bar 30 which is constrained for lateral movement by a downturned lip 31 provided on the arm 21. The knob 22 is positioned as shown in Fig. 4 when a card is loaded into the reader, but is moved to the opposite end of the slot 26 to load tape into the reader. In the latter position of the knob 22, the bar 30 is moved into engagement with the upturned side portion of the plate 25 and this causes the plate 13 in its loading position to be spaced a small distance from the guide portion 20 of the fixed arm 21. This small gap between the member 20 and plate 13 permits a length of tape to be slipped sideways into tape reading position between the plates 13 and 25 and into edge engagement with the locating guide 14 after which the plate assembly is moved to engage the sprocket drive wheels of the reading unit in the longitudinal drive holes of the tape.

The mechanical construction of the reading unit is essentially similar to the unit which is shown and described in detail in the aforementioned Blodgett patent and accordingly will only briefly be considered here. The construction shown in the latter includes a forwardly positioned sprocket drive wheel 33 (Fig. 7), and in the present construction a rearwardly positioned sprocket drive wheel has been added. Both sprocket wheels are similar in construction and are mounted upon respective shafts 34 and 35. A driving gear 36 is fixed to the shaft 34 and engages an idler gear 37 which in turn drivingly engages a gear 38 fixed to the shaft 35. The shaft 34 is driven by a ratchet wheel 39 (Fig. 6) fixed to the shaft 34, the ratchet wheel being engaged by a pall 40 pivoted on one end of an arm 41 which itself is pivoted at 42 and carries at its opposite end a cam follower 43 arranged to engage a cam 44 fixed on a drive shaft 45 driven from the associated writing machine. The pall 40 is biased by a spring 46 toward engagement with the ratchet wheel 39, to move the latter in step by step manner under control of the driven cam 44. The ratchet wheel 39 is retained in position after each drive step by a detent arm 47 pivoted at 48 and biased by a spring 49 to engage a roller 50 with the teeth of the ratchet wheel.

The reading of the punched holes in a punched tape or card is accomplished by a plurality of transversely spaced pins 53 (Fig. 5) corresponding in number to the number of holes used in the preselected punch code and aligned in spaced relation corresponding to the punched hole spacing. These pins are guided by a subcasting 54 and are pivotally connected at their bottom ends to respective arms 55 which are independently pivoted on a shaft 56 and are biased for clockwise rotation by a light spring 57 engaging a stud 58 on each arm. The arms 55 are restrained against clockwise rotation by a common bail 59 on the end of an arm 60 which is also pivoted on the shaft 56 and is biased for clockwise rotation by a spring 61. The arm 60 includes a notched end portion 62 which is engaged by a latch 63, pivoted at 64, when the arm 60 is rotated to its extreme counterclockwise position by a cam follower 65 supported on the arm in engaging relation with a cam 66 fixed on the driven shaft 45. A reading control magnet 67 moves the latch 63 to unlatched position during each reading interval, and this permits the arm 60 moving under control of the cam 66 to rotate clockwise once each reading cycle and thereby move its associated bail 59 out of engagement with the arms 55. This allows the reading pins 53 to move into engagement with the bottom surface of the punched tape or card or through corresponding punched holes in the latter. Thus the presence or absence of punched holes in the tape or card is sensed by the reading pins 53 once each reading cycle, a reading cycle being one revolution of shaft 45 during which the pins are moved into and out of engagement with the tape and the tape or card is subsequently indexed by the mechanism shown in Fig. 6.

Figure 2:
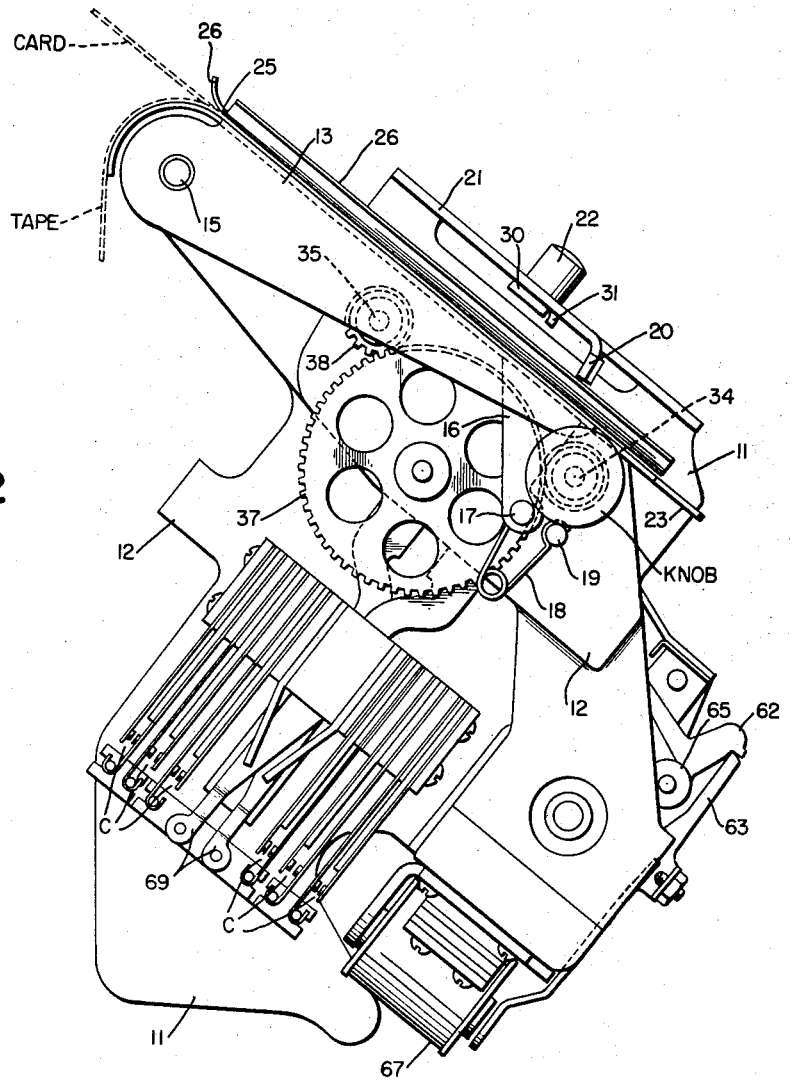
Figure 3:
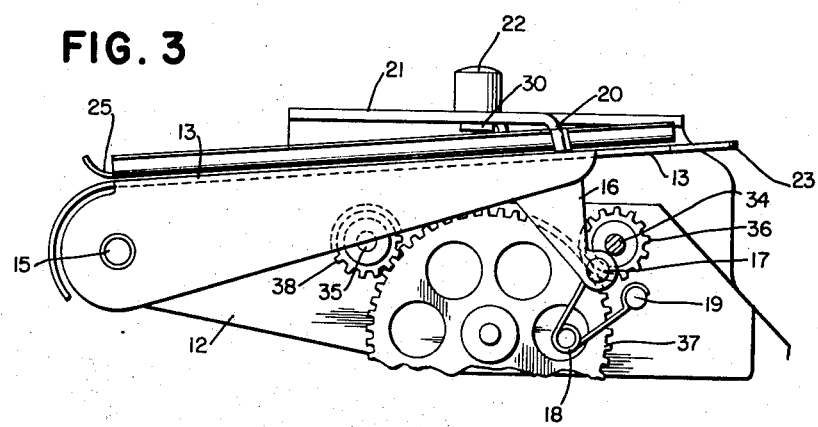
Figure 7:
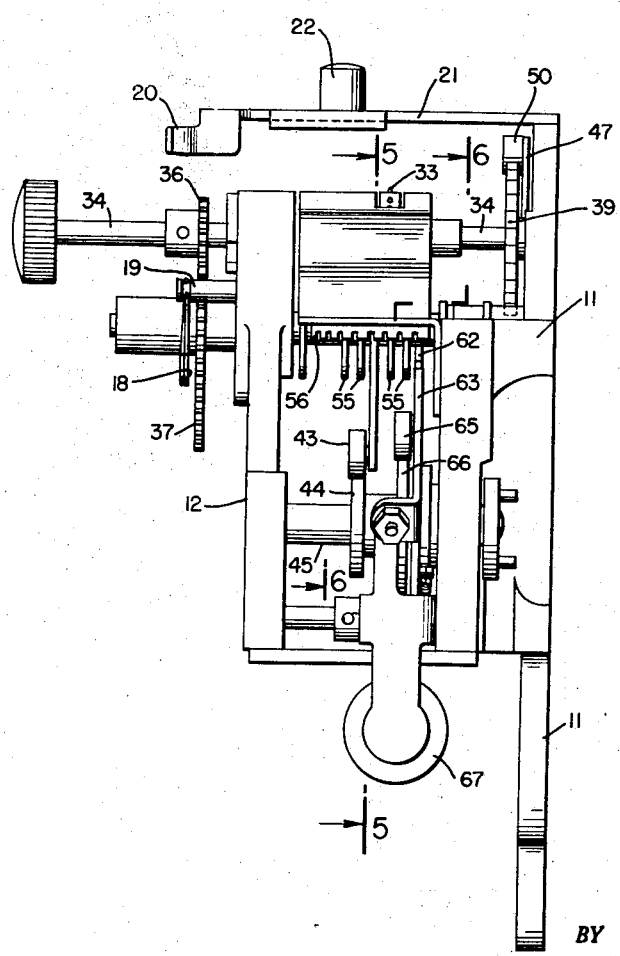

As shown more clearly in Fig. 2, and as described in greater detail in the aforementioned Blodgett patent, the reading unit includes a plurality of electric circuit contacts C arranged in contact groups and contact banks each controlled by one of the reading pins. It is explained in the Blodgett patent that each bank of contacts is normally maintained in a nonoperating position, with certain contacts of the bank closed and certain open, by operation of pivoted arms 69 individual to each bank. Each such arm is retained in nonoperated position by its associated arm 55 if the corresponding reading pin does not extend through a punched hole in a card or tape being read, but is movable to operative position (to open the normally closed contacts and close the normally open contacts of the bank) whenever the associated reading pin projects through a punched hole in the card or tape. The arms 69 are permitted to sense the position of the reading pins once during each reading cycle.

While a specific form of invention has been described for purposes of illustration, it is contemplated that numerous changes may be made without parting from the spirit of the invention.

What is claimed is:

1. A reader for reading information code-recorded on tape and card record media comprising, code reading means, feed means for moving tape and card media past said reading means to read the information recorded thereon, a guide platform pivoted for manual movement to a first loading position at which either form of said record medium is loaded into said reader out of engagement with said feed means and to a second read position at which said loaded medium is drivingly engaged by said feed means, and stop means cooperating with said platform in said loading position thereof for initial prepositioning of the leading edge of card media with respect to said code reading means.

2. A reader for reading information code-recorded on tape and card record media comprising, code reading means, feed means for moving tape and card media past said reading means to read the information recorded thereon, a guide platform pivoted for manual movement to a first loading position at which said media is loaded into said reader out of engagement with said feed means and to a second read position at which said media is drivingly engaged by said feed means, and fixed stop means cooperating with said platform in said loading position thereof for initial prepositioning of the leading edge of card media to effect in said second position of said platform registration between said reading means and the first recording segment of said card media.

3. A reader for information code-recorded on repetitively narrow tape and wider card recording media comprising, code reading means, feed means for moving tape and card media past said reading means to read the information recorded thereon, a guide platform pivoted for manual movement to a first loading position at which said media are loaded into said reader out of engagement with said feed means and to a second read position at which said media are drivingly engaged by said feed means, means tending to retain said platform in either position in which it is manually placed, and fixedly positioned stop means cooperating with said platform in said loading position thereof for selectively utilizing the wider width of said card media initially to preposition the leading edge of each card in desired positional relationship to said reading means.

4. A reader for reading information punch-code-recorded on tape and card record media comprising, code reading means including a plurality of aligned reading pins for sensing the presence and absence of code apertures in a read medium, feed means for moving tape and card media past said reading means to read the information recorded thereon, a guide platform pivoted for manual movement to a first loading position at which said media are loaded into said reader out of engagement with said feed means and to a second read position at which said media are drivingly engaged by said feed means, and fixed stop means cooperating with said platform in said loading position thereof for initial prepositioning of the leading edge of card media to effect in said second position of said platform registration between said reading pins and the first available punch code of said card media.

5. A reader for reading information code-recorded on tape and card record media comprising, code reading means, feed means for moving tape and card media past said reading means to read the information recorded thereon, a generally planar guide platform pivoted for manual movement to a first loading position at which said media are loaded into said reader out of engagement with said feed means and to a second read position at which said media are drivingly engaged by said feed means, a generally planar hold-down member fixedly positioned in parallel spaced relation to said guide platform and pivotally movable therewith, and stop means cooperating with said platform in said loading position thereof for initial prepositioning of the leading edge of card media with respect to said code reading means.

6. A reader for reading information code-recorded on tape and card record media comprising, code reading means, feed means for moving tape and card media past said reading means to read the information recorded thereon, a generally planar guide platform pivoted for manual movement to a first loading position at which said media are loaded into said reader out of engagement with said feed means and to a second read position at which said media are drivingly engaged by said feed means, a generally planar hold-down member fixedly positioned in parallel spaced relation to said guide platform and pivotally movable therewith, a detent member supported by said hold-down member and positioned to engage longitudinally spaced feed apertures in said record media to provide feed-detent restraint action thereon, and stop means cooperating with said platform in said loading position thereof for initial prepositioning of the leading edge of card media with respect to said code reading means.

7. A reader for reading information code-recorded on tape and card record media having prepunched feed holes comprising code reading means, at least one feed drive sprocket having teeth engageable with the feed holes of said media for moving said media past said reading means to read the information recorded thereon, a guide platform pivoted for manual movement to a first loading position at which said media is loaded into said reader out of engagement with each said feed sprocket and to a second position at which the sprocket holes of said media are drivingly engaged by each said feed sprocket, fixed stop means cooperating with said platform in said loading position thereof for initial prepositioning of the leading edge of card media to effect in said second position of said platform registration between said reading means and the first recording of said card media, and detent means carried by said platform for engaging a feed hole of said media during loading thereof into said reader to preposition said feed holes with relation to the teeth of each said drive sprocket.

8. A reader for reading information code-recorded on tape and card record media comprising code reading means, feed means for moving tape and card media past said reading means to read the information recorded thereon, a guide platform pivoted for manual movement to a first loading position at which said media is loaded into said reader out of engagement with said feed means and to a second read position at which said media is drivingly engaged by said feed means, stop means fixedly positioned to engage the surface of said platform in said first position thereof for initial prepositioning of the leading edge of card media to effect in said second position of said platform registration between said reading means and the first recording of said card media, and means manually operable to terminate said engagement of said stop means with said platform in said first position thereof to permit record tape to be loaded into said reader.

9. A reader for reading information code-recorded on tape and card record media comprising code reading means, feed means for moving tape and card media past said reading means to read the information recorded thereon, a guide platform pivoted for manual movement to a first loading position at which said media is loaded into said reader out of engagement with said feed means and to a second read position at which said media is drivingly engaged by said feed means, fixed stop means positioned to engage the surface of said platform when moved to said first position thereof for initial prepositioning of the leading edge of card media to effect in said second position of said platform registration between said reading means and the first recording of said card media, and means carried by said stop means and manually movable between two positions in one of which said stop means effects said engagement with said platform and in the other of which said stop means is held from engagement with said platform to permit the loading of record tape into said reader.

10. A reader for reading information code-recorded on tape and card record media comprising code reading means, feed means for moving tape and card media past said reading means to read the information recorded thereon, a guide platform pivoted for manual movement to a first loading position at which said media is loaded into said reader out of engagement with said feed means and to a second read position at which said media is drivingly engaged by said feed means, and a fixedly positioned bracket having a stop portion extending transversely of said platform and engaging the surface thereof when said platform is moved to said loading position thereof to effect initial prepositioning of the leading edge of card media and thereby effect registration between said reading means and the first recording of said card media when said platform is moved to said reading position thereof.

11. A reader for reading information code-recorded on tape and card record media comprising code reading means, feed means for moving tape and card media past said reading means to read the information recorded thereon, a guide platform assembly having planar members united along one edge and in spaced relation to receive therebetween and edge guide said record media, means for pivoting said platform assembly for manual movement to a first loading position at which said media is loaded into said reader out of engagement with said feed means and to a second position at which said media is drivingly engaged by said feed means, and fixed stop means cooperating with said platform in said loading position thereof for initial prepositioning of the leading edge of card media to effect in said second position of said platform registration between said reading means and the first recording of said card media.

12. A reader for reading information code-recorded on tape and card record media comprising: code reading means; feed means for moving tape and card media past said reading means to read the information recorded thereon; a guide platform assembly having planar members united along one edge with, and spaced by, an intervening record-media edge-guide member of thickness selected to provide light frictional contact between said planar members and a record medium inserted therebetween; means for pivoting said platform assembly for manual movement to and retention at a first loading position at which said media is loaded into said reader out of engagement with said feed means and a second read position at which said media is drivingly engaged by said feed means; and fixed stop means cooperating with said platform in said loading position thereof for initial prepositioning of the leading edge of card media to effect in said second position of said platform registration between said reading means and the first recording of said card media.

13. A reader for reading information code-recorded on tape and card record media comprising spaced base and sub-base support members, code reading means supported transversely between said members, feed means supported transversely between said members for moving tape and card media past said reading means to read the information recorded thereon, a guide platform pivoted at one end on a shaft supported by and transversely of said members, said platform being manually movable to a first loading position at which said media is loaded into said reader out of engagement with said feed means and to a second read position at which said media is drivingly engaged by said feed means, and stop means fixedly supported by one of said members to extend across said guide platform and engage the surface thereof when said platform is positioned in said loading position thereof for initial prepositioning of the leading edge of card media to effect in said second position of said platform registration between said reading means and the first recording of said card media.

14. A reader for reading information code-recorded on tape and card record media having prepunched feed holes comprising: fixedly spaced and united base and sub-base support members; code reading means supported between said members; sprocket drive means supported between said members and having teeth engageable with said feed holes for moving tape and card media past said reading means to read information recorded thereon; a guide platform assembly having planar members united along one edge with, and spaced by, an intervening record-media edge-guide member of thickness selected to provide light frictional contact between said planar members and a record medium inserted therebetween; means including a shaft supported by transversely of said members to pivot said platform assembly for manual movement to, and retention by over-center-spring bias at, a first loading position at which said media is loaded into said reader out of engagement with said feed means and a second read position at which the feed holes of said media are drivingly engaged by the teeth of said sprocket drive means, fixed stop means supported by one of said base members in extending relation across said platform assembly to engage the surface of the lower of said planar members when said platform assembly is in said first position thereof and thereby effect initially prepositioning of the leading edge of card media and registration between said reading means and the first recording of said card media when said platform assembly is moved to said second position thereof; and detent means carried by the upper of said planar members for engaging a feed hole of said record media and restrain movement thereof as said platform assembly is moved from said first to said second position thereof.

No references cited.